United States Patent
Richter et al.

(10) Patent No.: US 6,758,106 B2
(45) Date of Patent: Jul. 6, 2004

(54) LIQUID PROPORTIONING METHOD AND APPARATUS FOR IMPLEMENTING THE METHOD

(75) Inventors: Jorg Richter, Belsch (DE); Boris Von Beichmann, Hamburg (DE); Gerhard Salje, Hamburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 10/199,605

(22) Filed: Jul. 18, 2002

(65) Prior Publication Data

US 2003/0019305 A1 Jan. 30, 2003

(30) Foreign Application Priority Data

Jul. 27, 2001 (DE) .......................................... 101 36 790

(51) Int. Cl.[7] .............................. B01L 3/02; G01N 1/14
(52) U.S. Cl. .................................... 73/864.11; 422/100
(58) Field of Search ......................... 73/863.02, 864.11, 73/864.15, 864.16; 422/100, 63

(56) References Cited

U.S. PATENT DOCUMENTS

| | | | | |
|---|---|---|---|---|
| 3,719,087 A | * | 3/1973 | Thiers ..................... | 73/864.14 |
| 4,459,267 A | * | 7/1984 | Bunce et al. ............. | 422/100 |
| 5,013,529 A | * | 5/1991 | Itoh ......................... | 422/100 |
| 5,035,150 A | | 7/1991 | Tompkins | |
| 5,158,748 A | * | 10/1992 | Obi et al. ................. | 422/100 |
| 5,287,733 A | * | 2/1994 | Oku et al. ................ | 73/64.56 |
| 5,325,867 A | | 7/1994 | Skrabal | |
| 5,853,665 A | * | 12/1998 | Ade et al. ................. | 422/62 |
| 6,158,269 A | | 12/2000 | Dorenkott | |
| 6,551,557 B1 | * | 4/2003 | Rose et al. ............... | 422/100 |

FOREIGN PATENT DOCUMENTS

| | | |
|---|---|---|
| DE | 9612797 | 10/1996 |
| DE | 0022398 | 1/2002 |
| EP | 0904840 | 3/1999 |

* cited by examiner

*Primary Examiner*—Hezron Williams
*Assistant Examiner*—Charles Garber
(74) *Attorney, Agent, or Firm*—Sidley Austin Brown & Wood, LLP

(57) ABSTRACT

A liquid proportioning method using a chamber for a gas and a reception volume connectable thereto for a liquid with an aperture to the environment, wherein a desired volume is predetermined for the liquid to be taken up by the reception volume, a chamber negative pressure is determined which has to exist in the chamber to cause the desired liquid volume to be taken up in the reception volume after the aperture is dipped into the liquid and the chamber is connected to the reception volume, the chamber negative pressure is produced in the chamber, the reception volume dips its aperture into the liquid, and the chamber is connected to the reception volume and the desired volume of the liquid is taken up in the reception volume.

5 Claims, 2 Drawing Sheets

LIQUID PROPORTIONING METHOD AND APPARATUS FOR IMPLEMENTING THE
METHOD

BACKGROUND OF THE INVENTION

1. Field of the Invention

The invention relates to a liquid proportioning method and an apparatus for implementing the method.

2. Field of the Invention

Pipettes and other proportioning systems which operate according to the air cushion principle have been known already. They involve displacing an air column to draw the liquid into a pipette tip and to expel it therefrom. The displacement of the air column is performed by a piston in a cylinder. In hand-operated pipettes, the piston is displaced by means of an actuator button against the action of a restoring spring. In pipettes the proportioning volume of which is adjustable, an adjustable stop exists to limit the piston stroke. Adjustment is effected by means of a rotary toothed wheel which acts on the stop via a gearing with the proportioning volume adjusted being read by means of a counter.

In the known hand-operated pipettes, it is time-consuming and cumbersome to adjust the proportioning volume. The gearing to shift the stop has been designed so as to effect the desired precision of adjustment. In the most unfavorable case, this gearing has to be shifted through the entire setting range. Moreover, it is unfavorable ergonomically that the displacement of the piston stop changes the stroke of the actuation button for the piston. It is particularly unfavorable that if there are small proportioning volumes short actuation strokes have to be performed at a comparatively high expenditure of force against the action of the restoring spring.

Accordingly, it is the object of the invention to provide a method for the proportioning of liquids and an apparatus for the proportioning of liquids that has more favourable handling attributes.

SUMMARY OF THE INVENTION

This object is attained by a method of the proportioning of liquids using a chamber for a gas and a reception volume connectable thereto for a liquid with an aperture to the environment, in which:

- a desired volume is predetermined for the liquid to be taken up by the reception volume,
- a chamber negative pressure is determined which has to exist in the chamber to cause the desired liquid volume to be taken up in the reception volume after the aperture is dipped into the liquid and the chamber is connected to the reception volume,
- the chamber negative pressure is produced in the chamber,
- the reception volume dips its aperture into the liquid, and
- the chamber is connected to the reception volume and the desired volume of the liquid is taken up in the reception volume.

In the inventive method, the proportioning volume is not adjusted by a variation to a piston stroke as is done in the state of the art. Rather, a chamber negative pressure is determined on the basis of a predetermined desired volume and is produced in a chamber the consequence of which, after the aperture is dipped into a liquid and the reception volume is connected to the chamber, is that accurately the desired volume ascends into the reception volume. The interconnection between the desired volume and the associated chamber negative pressure, for instance, may be determined for a liquid empirically (by experiments, in particular). However, it may also be calculated, for instance, by a calculation of the desired negative pressure which has to prevail in the reception volume above the liquid to maintain the desired volume of the liquid in the reception volume, and by a determination as to which chamber negative pressure initially has to be produced to accurately achieve the ascension of the volume desired for the liquid into the reception volume and the desired negative pressure above the liquid after the chamber is connected to the reception volume. Irrespective of the way the chamber negative pressure is determined in detail it is more readily realizable and facilitates handling very much to preset the desired volume and to determine and produce the chamber negative pressure than it is to adjust the proportioning and to actuate the piston in the state of the art.

It is preferred that the gas present in the chamber is air. The chamber negative pressure can be produced in different ways. According to an aspect of the method, a negative pressure produced in the chamber is measured and is matched to the chamber negative pressure following a comparison thereto.

Basically, it is possible to effect such matching to the chamber negative pressure by increasing the negative pressure in the chamber. According to an aspect, a negative pressure which exceeds the chamber negative pressure is initially produced in the chamber and the chamber negative pressure is then achieved by partial pressure compensation between the chamber and the environment. This allows to produce the chamber negative pressure in a particularly simple and precise manner.

According to another aspect, the negative pressure in the chamber is matched automatically to the chamber negative pressure.

It is not always necessary to dispense the liquid which was taken up to the outside from the reception volume, e.g. if it is intended to undergo an analysis or further methoding in the reception volume or a device having the reception volume. For delivery to the outside from the reception volume, according to an aspect, the liquid which was taken up is expelled from the aperture of the reception volume by applying a positive pressure to the reception volume. For instance, a volume desired for a liquid may be taken up in the reception volume from a reservoir and may be delivered into a reaction vessel from the reception volume.

According to an aspect, the desired volume is introduced manually. Since there is no forced coupling to a gearing to shift a piston stop the introduction of the desired volume is very easy in operation.

According to an aspect, the negative pressure and/or positive pressure is produced by means of a manually operable gas displacement device. This makes it possible to implement the method with a particularly low number of instruments.

According to an aspect, the gas displacement device, upon production of the negative pressure and/or positive pressure, is operated by a certain actuation distance independent on the choice made for the desired volume. This makes handling easier than do the variable ways of operation for the known adjustable pipettes.

Basically, it is possible to displace the liquid from the reception volume always at the same volume displacement rate whatever the desired volume is. If the volume displacement rate of the gas displacement device has been agreed with the maximum desired volume adapted to be preset and if a desired volume is preset which is smaller the result is that liquid will be expelled only via a short portion of the actuation distance of the gas displacement device. This, in turn, may cause errors in proportioning. For a "more delicate" delivery of liquid while utilizing the whole actuation distance, according to an aspect, the positive pressure applied to the reception volume is controlled so as to expel the liquid substantially through the entire actuation distance of the gas displacement device with no regard to the desired volume chosen. That part of the actuation distance which was passed through can be measured by a distance sensor here.

In any case, an excess stroke may be provided to make sure the liquid is virtually expelled completely from the reception volume.

An apparatus suited for use in implementing the method has
- a chamber for a gas,
- a reception volume for liquid that is connected to the chamber via a first valve means with an aperture to the environment,
- a gas displacement device connected to the chamber via a second valve means,
- a pressure sensor connected to the chamber,
- input means for the desired volume and for controlling the reception and/or delivery of liquid, and
- a control means which is connected to the input means, the pressure sensor, and the valve means to control the generation of the chamber negative pressure in the chamber and the reception of liquid into the reception volume and/or the delivery of liquid from the reception volume.

If gas requires to be displaced from the gas displacement device prior to the generation of the chamber negative pressure the first and second valve means may be opened for the gas to escape to the environment. While the gas is being displaced from the gas displacement device it is also possible to open the second valve means and a third valve means connecting the chamber to the environment.

To produce the chamber negative pressure, the first valve means and the third valve means that might possibly be present are closed and the second valve means is opened. Thereafter, gas may be withdrawn from the chamber by means of the gas displacement device. This can cause a gradual rise in the negative pressure, which is stopped when the pressure sensor detects the chamber negative pressure. The second valve means may be closed subsequently.

Instead, a negative pressure may be produced which is independent on the desired volume adjusted and exceeds the chamber negative pressure. The second valve means may be closed subsequently. Further, opening the first valve means and the third valve means that might possibly be present allows to diminish the chamber negative pressure until the pressure sensor detects the chamber negative pressure.

The control means controls the operation of the valve means based on the information which is entered by the input means and the measuring values which are made available by the pressure sensor. In this way, it becomes possible to provide a hand-operated pipette operated by two buttons, one button being used to enter the desired volume and the other button to actuate the gas displacement device. The hand-operated pipette may be designed so as to make operation largely equal to the operation of conventional hand pipettes.

Another apparatus apt to implement the method differs from the aforementioned one by the fact that the chamber is not connected to the gas displacement device via a second valve means, but that the gas displacement device has the chamber as a displacement chamber. The control means is connected to the first valve means and possibly a third valve means which connects the chamber to the environment.

This apparatus allows to displace gas from the displacement chamber by opening the first valve means and the third valve means that might possibly be present. Subsequently, the first and third valve means are closed and the negative pressure is produced in the displacement chamber. This procedure can be limited by the chamber negative pressure which is reached. Instead, it is possible to produce a negative pressure exceeding the chamber negative pressure which does not depend upon the desired volume chosen and to set the chamber negative pressure by opening the first and third valve means. The operation of the first and third valve means is controlled by the control means based on the information which is entered by means of the input devices and the measuring values which are made available by the pressure sensor. This apparatus can be realized at a particularly low expenditure because it generally makes it do with a single valve means.

In both solutions, the liquid withdrawn from the reception volume may be expelled by an actuation of the gas displacement device. In the first apparatus, the positive pressure can be led into the reception volume through the chamber while opening the first and second valve means. Instead, the gas displacement device may be connected directly to the reception volume via a bypass including a fourth valve means and the control means may be connected to the fourth valve means in order to open it, causing it to dispense liquid if the gas displacement device produces a positive pressure. In the second apparatus, in which the gas displacement device has the chamber as a displacement chamber the positive pressure may be led into the reception volume directly by opening the first valve means.

According to an aspect, the input means for the desired volume have an adjusting wheel which readily allows to set the desired volume. The adjusting wheel may have markings or symbols to indicate the desired volume adjusted. A separate display may be dispensed with. The input means may have a sensor to detect the operation of the gas displacement device and control the reception or delivery of liquid based on such actuation.

According to an aspect, the gas displacement device is a piston-and-cylinder device or expansion bellows device. The gas displacement device may be designed similarly to that of conventional pipettes.

It is preferred that the operation of the gas displacement device is manual. As a principle, however, it may be operated by a motor.

According to an aspect, the gas displacement device has a spring means to restore it to an initial position. Then, the gas displacement device needs to be operated in one direction only. It is preferably operated to press gas out of the gas displacement device as in conventional pipettes.

According to an aspect, the reception volume is an exchangeable pipette tip. Commercial pipette tips may be employed. Those are preferably made of plastic.

According to an aspect, the control means and/or the pressure sensor and/or the valve means and/or the input means are electric devices and there is an electric power supply to feed at least one electric device.

According to an aspect, said electric device is at least one battery or at least one accumulator, specifically in case of a hand-operated apparatus.

According to an aspect, the apparatus is a hand-operated apparatus.

Finally, an aspect provides that there are a plurality of parallel reception volumes to realize a multi-channel pipette.

BRIEF DESCRIPTION OF THE DRAWINGS

The invention will be described in more detail below with reference to the accompanying drawings of an embodiment. In the drawings.

DETAILED DESCRIPTION OF THE PREFERRED EMBODIMENT

Figure 1:
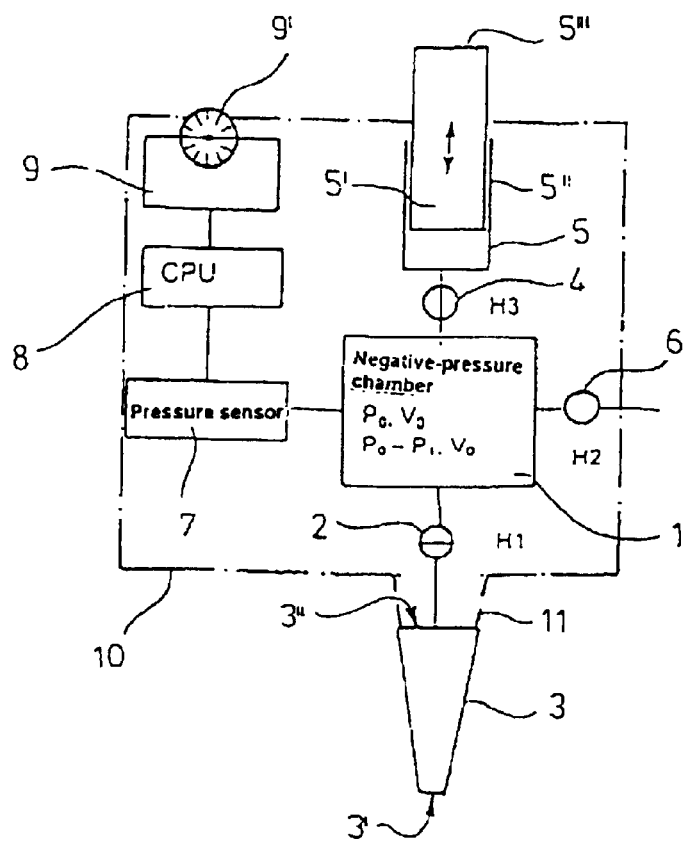
FIG. 1 is a manually operable hand pipette while forcing the air out in a roughly schematic block diagram.

The apparatus has a chamber 1 for a gas. Chamber 1 is connected to an exchangeable pipette tip 3 via a first valve means 2. The tip has an aperture 3' below to the environment. Further, chamber 1 is connected to a piston-and-cylinder device 5 via a second valve means 4. The device has piston 5' which is axially slidably disposed in a cylinder 5". Piston 5' is connected to an actuation button 5''' at top. Chamber 1 is connected to the environment via a third valve means 6.

Chamber 1 has connected thereto a pressure sensor 7. Pressure sensor 7 is connected to a computer 8 (e.g. a microcomputer). In addition, computer 8 is connected to valve means 2, 4, and 6.

Computer 8 has connected thereto input means 9. These have a rotary adjusting wheel 9' with markings to indicate the desired volume adjusted. Elements 1, 2 and 4 to 9 are housed in a casing 10. It has a seat 11 at bottom (e.g. a slip-in cone) on which pipette tip 3 is seated with its upper aperture 3". Adjusting wheel 9' and actuation button 5''' project from casing 10 at top.

The apparatus operates as follows:

A desired volume $V_{des}$ requiring introduction is introduced by means of the input means 9. Computer 8 calculates a desired negative pressure $P_{des}$, which has to prevail above the liquid level in pipette tip 3 in order that pipette tip 3 accurately receives the desired volume $V_{des}$ of liquid. The desired negative pressure $P_{des}$ can be determined by balancing the forces acting on the liquid column having the desired volume $V_{des}$ of liquid in pipette tip 3. The rule is:

$$P_0 - P_{des} = \rho \times g \times h \quad (1)$$

where:

$P_0$=Ambient pressure
$\rho$=Specific gravity of the liquid
$g$=Acceleration due to gravity
$h$=height of liquid column having the desired volume $V_{des}$ of liquid in the pipette tip Height h can be determined as follows:

$$V_{des} = \int_o^h Q(y) dy \quad (2)$$

where:

$Q(y)$=Cross-section of the pipette tip at a distance y from the aperture.

The integral is easily resolvable for a conical and/or cylindrical pipette tip.

For a calculation of the desired negative pressure $P_{des}$, computer 8 needs to be specifically informed about the desired volume $V_{des}$, the specific gravity of the liquid, and the geometrical data of pipette tip 3. This can be accomplished by means of input means 9. The geometrical data and the specific gravity may also be stored. In case of need, a selection may be made amongst stored values by means of input means 9.

Based on the desired negative pressure $P_{des}$, computer 8 calculates the chamber negative pressure $P_1$ which has to prevail in chamber 1 before it is connected to pipette tip 3. Presupposing that the number of gas particles and the temperature of the gas remain constant in the system while chamber 1 is being connected to pipette tip 3 a calculation of $P_1$ may be made with the formular which follows, assuming the gas to be an ideal gas:

$$(P_0-P_{des}) \times V_x = (P_0-P_1) \times V_0 + P_0 \times V_S$$

where:

$V_0$=Volume of the chamber up to the valve means
$V_S$=Volume of the pipette tip up to the first valve means
$V_x = V_0 + V_S - V_{des}$=Volume in which the negative pressure $P_{des}$, prevails when the desired volume $V_{des}$ of the liquid is in the pipette tip.

Figure 2:
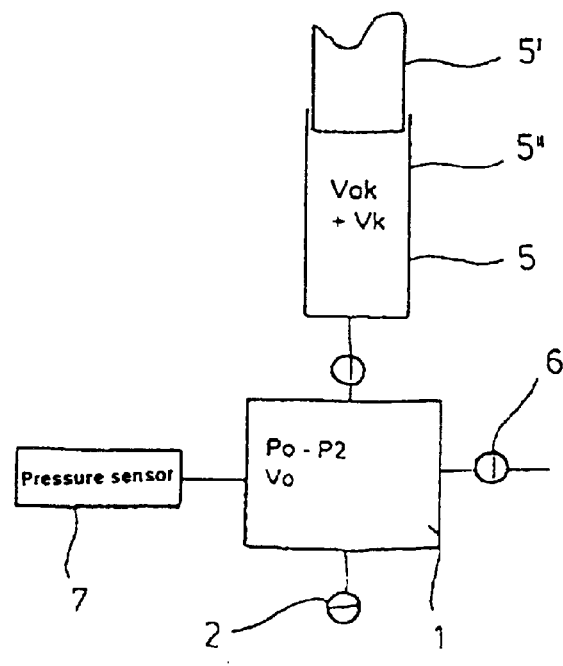
FIG. 2 is the same pipette while generating a negative pressure out in the roughly schematic block diagram.

Initially, according to FIG. 1, air is forced out of the piston-and-cylinder device 5 by pressing piston 5' downwards when valve means 4 and 6 are open. Subsequently, valve means 6 is closed and piston 5' is moved upwards as is shown in FIG. 2, e.g. by a piston restoring spring. At this point, valve means 2 is closed and a negative pressure $P_2$ is produced in chamber 1. This negative pressure $P_2$ is chosen so as to be larger than are all of the chamber negative pressures $P_1$ in the setting range of the pipette. Valve means 4 will also be closed afterwards.

Figure 3:
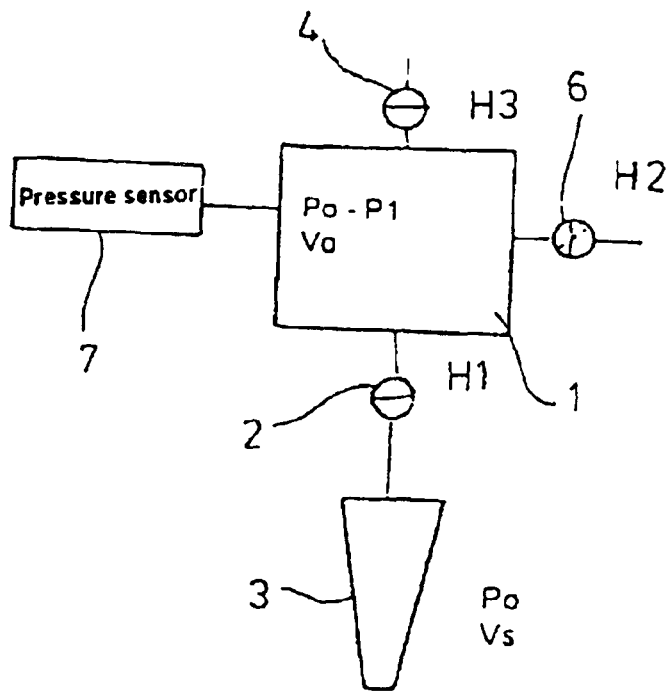
FIG. 3 is the same pipette after adjusting the chamber negative pressure in the roughly schematic block sub-diagram.

Thereafter, according to FIG. 3, computer 8 carries out a controlled aeration procedure to set the desired chamber pressure $P_1$ in chamber 1 via valve means 6. During this regulation procedure running in the background, pipette tip 3 may have dipped its aperture 3' into the liquid already. The regulation procedure may run so quickly that the user does not become aware of the delay in liquid reception before valve means 2 is opened.

Figure 4:
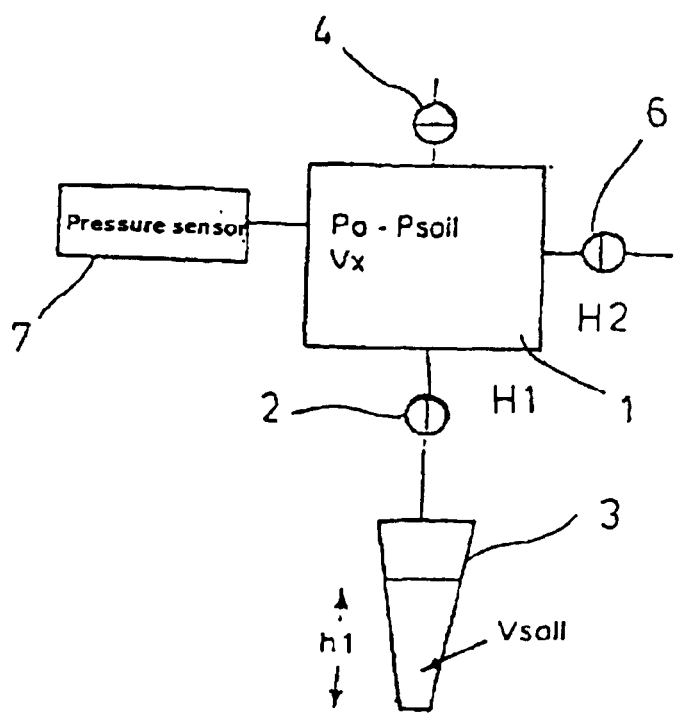
FIG. 4 is the same pipette after receiving the desired volume in the roughly schematic block sub-diagram.

When valve means 2 is open valve means 4 and 6 remain closed. The flow rate of valve means 2 may have been chosen so that the flow-in speed of the liquid corresponds to the one occurring when the piston of a conventional hand-operated pipette is relieved of a load. The desired volume $V_{des}$ is received in pipette tip 3 and the desired negative pressure $P_{des}$, arises in pipette tip 3. This is shown in FIG. 4.

The delivery of the liquid is caused by a downward motion of piston 5' after valve means 4 is opened. A particular excess stroke is unnecessary because the air volume displaced by the piston-and-cylinder device 5 anyhow is larger than is the desired volume $V_{des}$. It is generally possible to utilize the upward motion of piston 5' that follows after delivery as an aid already to build up a negative pressure in chamber 1 again. However, piston 5' may be pressed down anew to help develop the negative pressure.

The apparatus may be operated similarly to the operation of conventional reciprocating-piston pipettes. The control of valve means 2, 4, G may be effected from computer 8 depending on the operation of piston 5'. To this effect, for instance, a sensor may be present which detects the motion of piston 5', or a push-button which is released every time the actuation button 5" is operated.

What is claimed is:

1. A liquid proportioning method using a gas chamber (1) and a reception volume (3) connectable to the gas (1) and having an aperture (3') communicating with environment, the method comprising the steps of:

determining a desired volume of liquid to be taken up by the reception volume;

determining a negative pressure which has to exist in the gas chamber (1) for the desired volume of liquid to be taken up in the reception volume (3) after the aperture (3') thereof is dipped into the liquid and the reception volume (3) is connected to the chamber (1);

producing the determined negative pressure in the chamber (1);

dipping the aperture (3') of the reception volume (3) into the liquid; and connecting the reception volume (3) to the chamber (1), whereby the desired volume of liquid is taken up in the reception volume (3);

wherein the negative pressure-producing step includes producing the negative pressure with a manually operable gas displacement device which is operated by a certain actuation distance independent from the determined desired volume of the liquid.

2. The method according to claim 1, comprising the step of producing a positive pressure in the chamber (1) which is applied to the reception volume (3) and which is controlled so as to expel the liquid substantially though an entire actuation distance of the gas displacement device (5) independent from the determined desired volume of the liquid.

3. A liquid proportioning method using a gas chamber (1) and a reception volume (3) connectable to the gas chamber (1) and having an aperture (3') communicating with environment, the method comprising the steps of:

determining a desired volume of liquid to be taken up by the reception volume;

determining a negative pressure which has to exist in the gas chamber (1) for the desired volume of liquid to be taken up in the reception volume (3) after the aperture (3') thereof is dipped into the liquid and the reception volume (3) is connected to the chamber (1);

producing the determined negative pressure in the chamber (1);

dipping the aperture (3') of the reception volume (3) into the liquid; and connecting the reception volume (3) to the chamber (1), whereby the desired volume of liquid in taken up in the reception volume (3);

wherein the negative pressure-producing step includes determining a negative pressure available, in the chamber, comparing the determined negative pressure, which has to exist in the chamber for the desired volume of liquid to be taken up in the reception volume, with the negative pressure available in the chamber, and matching the determined negative pressure to the negative pressure available in the chamber, and wherein matching of the determined negative pressure to the negative pressure available in the chamber is effected automatically, and the desired volume of liquid is adjusted manually.

4. The method according to claim 3, wherein a negative pressure, which is less than the chamber negative pressure, is initially produced in the chamber (1) and is then matched to the chamber negative pressure by partial pressure compensation between the chamber (1) and the environment.

5. The method according to claim 3, wherein the liquid volume, which was taken up, is expelled from the aperture (3') of the reception volume (3) by applying a positive pressure to the reception volume, (3).

* * * * *